United States Patent [19]

Scheffler

[11] 4,388,497

[45] Jun. 14, 1983

[54] TELEPHONE POWER SUPPLY ARRANGEMENT

[75] Inventor: Hartmut Scheffler, Aspach, Fed. Rep. of Germany

[73] Assignee: Licentia Patent-Verwaltungs-G.m.b.H., Frankfurt am Main, Fed. Rep. of Germany

[21] Appl. No.: 239,101

[22] Filed: Feb. 27, 1981

[30] Foreign Application Priority Data

Feb. 28, 1980 [DE] Fed. Rep. of Germany ....... 3007468

[51] Int. Cl.³ .......................................... H04M 19/00
[52] U.S. Cl. ...................................... 179/77; 179/70; 179/18 FA
[58] Field of Search ............... 179/81 R, 84 R, 84 A, 179/70, 77, 18 R, 18 FA, 16 AA

[56] References Cited

U.S. PATENT DOCUMENTS 3,562,561 2/1971 Klusterman ........................... 179/70
4,272,650 6/1981 Bolgiano et al. ...................... 179/77

FOREIGN PATENT DOCUMENTS 1092975 11/1967 United Kingdom .................. 179/70

Primary Examiner—Gerald L. Brigance
Attorney, Agent, or Firm—Spencer & Kaye

[57] ABSTRACT

In a circuit for supplying power to a subscriber telephone device connected to a central office via a two-wire line, which circuit includes a main power supply at the central office and a switching unit at the telephone device actuatable to place the device in operation and to connect an electrical load in circuit across the line, there are additionally provided an auxiliary power supply disposed at the central office and connected across the line when the telephone device is not in operation, and a circuit connected for selectively connecting the main power supply to the line when the telephone device is in operation.

10 Claims, 2 Drawing Figures

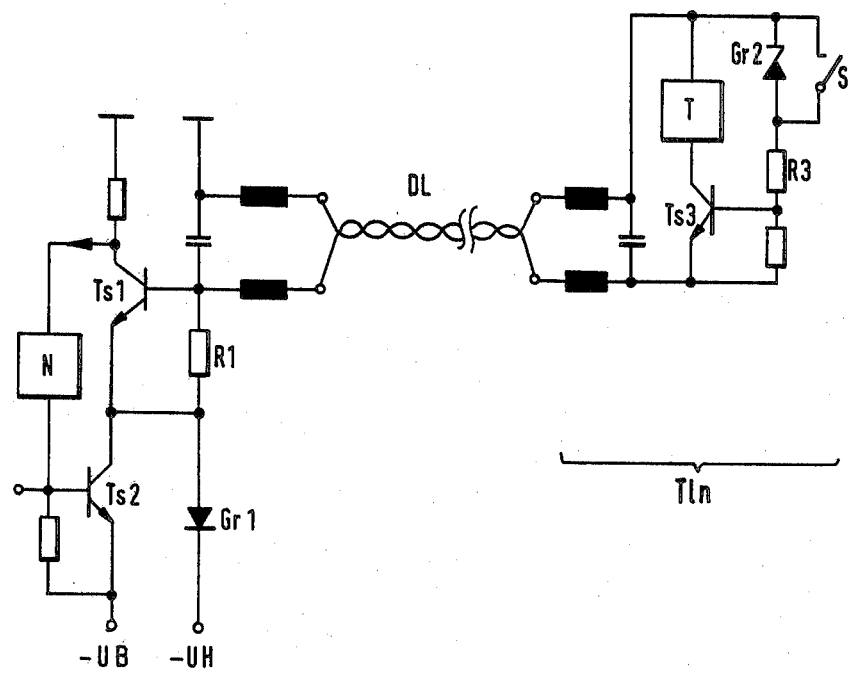

ically large current flows via the closed switch S to actuate the transistor switch Ts3 even though the voltage on line DL is only the auxiliary voltage UH. With the transistor switch Ts3 thus actuated, the load T is connected directly across line DL so that a substantial current now flows through resistor R1 in the central office. This current flow through R1 actuates the transistor Ts1 which, in turn, actuates the transistor Ts2 to connect the central office main power supply voltage UB across the two-wire line. The subscriber can now release the switch S at his end since voltage UB maintains the transistor Ts3 in its conductive state via the breakdown of zener diode Gr2. When the call is completed and switch S is again opened, a resetting of the system to its initial state is effected in that the main power supply voltage UB across the line DL is interrupted at the central office via suitable, non-illustrated, means in the central office.

TELEPHONE POWER SUPPLY ARRANGEMENT

BACKGROUND OF THE INVENTION

The present invention relates to an arrangement for supplying power to a subscriber telephone from a central office power supply via a two-wire line connecting the central office to the telephone, the power supply circuit to the telephone being closed by actuating a switching means in the telephone set when there is an incoming or outgoing call.

Such subscriber feeder arrangements are known and are used in analog telephone exchange systems. A digital local network or a digital subscriber connection, however, requires the transfer of complex electronic functions from the central office to the subscriber. Many of these shifted electronic functions must be performed at a time when the user has not yet lifted the telephone handset for receiving an incoming call. In any case, to perform these functions, a power supply is necessary.

It has therefore been proposed to modify the conventional subscriber power supply arrangements in such a manner that power is continuously fed from the central office power supply independently of the operating state of the subscriber device. But this has the drawback of producing high current consumption.

It has therefore also been proposed to effect feeding of power at the subscriber's end from the power mains at the subscriber location, and thus to burden the subscriber with the power supply. However, this has the drawbacks of, firstly, high installation costs and secondly, loss of telephone service due to power failures.

SUMMARY OF THE INVENTION

It is therefore an object of the present invention to provide a subscriber supply arrangement of the above-mentioned type in which, without high costs, feeding of power is possible independently of the operating state of the subscriber device and wherein no current is consumed when the device is not in use.

The above and other objects are achieved, according to the invention, in a circuit for supplying power to a subscriber telephone device connected to a central office via a two-wire line, which circuit includes a main power supply at the central office and switching means at the telephone device actuatable to place the device in operation and to connect an electrical load in circuit across the line, by the provision of an auxiliary power supply disposed at the central office and connected across the line, and circuit means connected for selectively connecting the main power supply to the line.

The present invention results in the advantages that supply of power is possible, as before, from the central office, that this supplying can also take place after the user has completed a call, and that substantially no current is consumed when the device is not in use.

The invention is based on the idea of disconnecting the central office power supply from the two-wire double line when the telephone is not in use so that no current is consumed at those times. In order to meet the requirements of a digital system, i.e., to permit operation in the incoming as well as in the outgoing direction, the central office as well as the subscriber must be able to switch on the supply of power for the subscriber.

For this purpose, an auxiliary power source is provided at the central office and is applied via a decoupling diode across the central office ends of the two-wire line. The auxiliary voltage is selected to be so low, compared to the main central office power supply voltage and to the breakdown voltage of a zener diode in the subscriber instrument, that in the inactive state of the instrument, no current flows at all. If, however, a current does flow as a result of a user activating his instrument, this is recognized at the central office and the main supply voltage is connected across the two-wire line. Conversely, connection of the main power supply voltage across the two-wire line from the central office causes power to be supplied at the subscriber's end.

BRIEF DESCRIPTION OF THE DRAWING

The sole FIGURE of the drawing is a circuit diagram of a power supply control system according to a preferred embodiment of the invention.

DESCRIPTION OF THE PREFERRED EMBODIMENTS

In the FIGURE, the system components located at the central office are located to the left, those in the telephone instrument Tln are to the right. The two groups of components are connected together by a two-wire line DL. At the central office, one wire is grounded while the other wire is connected, via a resistor R1 and a decoupling diode Gr1 to the negative pole of an auxiliary power source providing a voltage UH. The point of connection between the resistor R1 and the decoupling diode Gr1 is connected, via an electronic switch Ts2, to the negative pole of the central office main power supply which provides a voltage UB. The electronic switch Ts2 can be actuated, via a network N connected to its base, by a transistor switch Ts1 whose base-emitter path is connected in parallel with the resistor R1. At the subscriber's end, the load T to be fed is connected, via a transistor switch Ts3, to the ends of the two-wire line DL at the subscriber's location. Moreover, a zener diode Gr2 is connected in shunt therewith and in series with a resistor R3 whose other end is connected to the base of the transistor switch Ts3.

In the inactive state of the instrument Tln, the transistor switch Ts2 at the central office end is blocked so that only the auxiliary voltage UH is applied to line DL via the rectifier Gr1 and the resistor R1. However, essentially no current flows since at the subscriber's end the zener diode Gr2 is not in its conductive state. The breakdown voltage of this latter diode is greater than the auxiliary voltage UH and thus the transistor switch Ts3 is not actuated.

When a call is coming in to the instrument, switch Ts2 is closed by application of a suitable voltage to its base, causing the central office power supply voltage UB to be applied to line DL via the switch Ts2 and the resistor R1. Since the breakdown voltage of the zener diode Gr2 is less than the central office power supply voltage UB, the transistor switch Ts3 is actuated by the current applied to its base via resistor R3 so that the load T is connected directly across the double line and thus the subscriber's instrument is activated.

For an outgoing call from the subscriber to the central office, a switch S, located at the subscriber's telephone and connected in parallel with the zener diode Gr2 is closed. The auxiliary voltage UH present at the instrument acts on the transistor switch Ts3 via resistor R3 to make that transistor conductive so that the load T is connected directly across the two-wire line. A sufficient current now flows in line DL to produce in the central office supply circuit a voltage drop across resistor R1 which renders transistor Ts1 coductive. The voltage thus appearing at the collector of transistor Ts1 is applied via network N to the base of the switch transistor Ts2 to cause that transistor to also become conductive; thus the central office main power supply voltage UB is connected to the two-wire line DL.

At the termination of a connection between subscriber and central office, the subscriber disconnects, and thus opens switch S. The supply circuit in the central office remains connected, however, so that the subscriber's circuit continues to remain in the active state. With an appropriate signal contained in the useful signal, the subscriber signals the end of his call to the central office. Then the central office blocks the transistor switch Ts2 so that the central office power supply is disconnected and only the auxiliary voltage UH remains effective. Since, however, the breakdown voltage of the zener diode Gr2 is greater than the auxiliary voltage UH, the transistor switch Ts3 is blocked so that there is no longer any current in the line.

If the main power supply has a voltage range of 50 to 75 volts a suitable voltage value of the auxiliary voltage UH is about 15 volts and that of breakdown voltage of the zener diode Gr2 is about 20 volts. The total resistance in series therewith is in the range of 1 to 2.5 k$\Omega$.

It will be understood that the above description of the present invention is susceptible to various modifications, changes and adaptations, and the same are intended to be comprehended within the meaning and range of equivalents of the appended claims.

What is claimed is:

1. In a circuit for supplying power to a subscriber telephone device connected to a central office via a two-wire line, which circuit includes a main power supply at the central office and switching means at the telephone device actuatable to place the device in operation and to connect an electrical load in circuit across the line, the improvement comprising: an auxiliary power supply disposed at said central office and connected across said line when said telephone device is not in operation; and circuit means connected for selectively connecting said main power supply to said line when said telephone device is in operation.

2. An arrangement as defined in claim 1 wherein said circuit means operate to disconnect said main power supply from said line when said telephone device is not in use.

3. An arrangement as defined in claim 2 wherein said switching means are arranged to be actuated in response to connection of said main power supply to said line.

4. An arrangement as defined in claim 3 wherein said switching means comprise a threshold switch having a control input circuit connected across said line.

5. An arrangement as defined in claim 4 wherein said control input circuit comprises a series arrangement of a zener diode and a resistance.

6. An arrangement as defined in claim 5 wherein said control input circuit further comprises a switch member connected across said zener diode.

7. An arrangement as defined in claim 6 wherein closing of said switch member acts to connect said electrical load across said line.

8. An arrangement as defined in claim 1 wherein said circuit means comprise a threshold switch located at the central office and connected to be rendered conductive for connecting said main power supply to said line.

9. An arrangement as defined in claim 8 further comprising a decoupling diode connected in series with said auxiliary supply across said line, and wherein said circuit means threshold switch includes a control input circuit connected at a point between one wire of said line and said decoupling diode.

10. An arrangement as defined in claim 9 wherein said control input circuit comprises a resistor and a switching transistor having inputs connected across said resistor and an output connected to actuate said threshold switch.

* * * * *